United States Patent
Enis et al.

(10) Patent No.: US 8,677,769 B2
(45) Date of Patent: Mar. 25, 2014

(54) MINERAL RECOVERY SYSTEM FOR DESALINATION

(76) Inventors: Ben M. Enis, Henderson, NV (US); Paul Lieberman, Torrance, CA (US)

( * ) Notice: Subject to any disclaimer, the term of this patent is extended or adjusted under 35 U.S.C. 154(b) by 1020 days.

(21) Appl. No.: 12/214,137

(22) Filed: Jun. 17, 2008

(65) Prior Publication Data

US 2009/0025421 A1    Jan. 29, 2009

Related U.S. Application Data

(60) Provisional application No. 60/937,041, filed on Jun. 25, 2007.

(51) Int. Cl.
   *B01D 29/01* (2006.01)

(52) U.S. Cl.
   USPC .................... 62/123; 62/317; 62/67

(58) Field of Classification Search
   USPC ............ 62/535, 57, 123, 532, 317, 318, 304, 62/164, 74, 67, 68, 69, 70, 430, 238.2, 62/54.1, 533, 534, 272, 285, 928, 931; 210/257.2, 258, 260, 195.1, 195.2, 210/321.66, 321.72, 321.74, 321.76, 210/321.83, 321.85, 652, 774, 676, 251
   See application file for complete search history.

(56) References Cited

U.S. PATENT DOCUMENTS

| | | | | |
|---|---|---|---|---|
| 262,622 | A | | 8/1882 | Schafhaus |
| 2,660,313 | A | * | 11/1953 | James ..................... 210/323.1 |
| 2,800,138 | A | * | 7/1957 | Peters et al. ................. 137/122 |
| 3,292,386 | A | * | 12/1966 | Johnson et al. ................ 62/123 |
| 3,342,039 | A | | 9/1967 | Bridge et al. |
| 3,528,256 | A | * | 9/1970 | Karnofsky ..................... 62/535 |
| 3,675,436 | A | * | 7/1972 | Ganiaris ........................ 62/535 |
| 3,817,048 | A | | 6/1974 | Burley |
| 3,835,658 | A | * | 9/1974 | Wilson ........................... 62/535 |
| 4,748,817 | A | * | 6/1988 | Oura et al. ....................... 62/74 |
| 5,394,706 | A | * | 3/1995 | Keus .............................. 62/123 |
| 5,589,058 | A | | 12/1996 | Bauer |
| 5,816,057 | A | * | 10/1998 | Dickey et al. ................. 62/123 |
| 6,658,889 | B2 | * | 12/2003 | Krylov ........................... 62/544 |
| 7,127,913 | B2 | * | 10/2006 | Witkamp et al. .............. 62/532 |

* cited by examiner

*Primary Examiner* — Frantz Jules
*Assistant Examiner* — Alexandro Acevedo Torres
(74) *Attorney, Agent, or Firm* — J. John Shimazaki

(57) ABSTRACT

The invention relates to a mineral recovery system that processes concentrated brine leftover from a desalination system, wherein the brine is introduced into a crystallization chamber in the form of a spray, and wherein by mixing it with super chilled air from the desalination system, the droplets will flash freeze and form a super chilled slurry mixture, wherein an agitator for mixing the super chilled slurry is provided at or near the bottom of the crystallization chamber. Multiple stilling chambers are preferably provided for further separating the water from the concentrated brine, to produce a heavily concentrated sludge containing mineral solids that can be removed from the brine and recovered for commercial purposes.

14 Claims, 9 Drawing Sheets

Standard Seawater Composition

| Molar | Salt | Concentration (g/liter) | Eutectic Temperature (C) | Eutectic Composition (w/%) |
|---|---|---|---|---|
| 0.425 | sodium chloride | 24.6 | −21.2 | 23.3 |
| 0.009 | potassium chloride | 0.67 | −11.1 | 19.8 |
| 0.0093 | calcium chloride *2H2O | 1.36 | −55 | 29.8 |
| 0.0255 | magnesium sulfate *7H2O | 6.29 | −3.9 | 19 |
| 0.023 | magnesium chloride *6H2O | 4.66 | −33.6 | 21.6 |
| 0.002 | sodium bicarbonate | 0.18 | −2.1 | 5.9 | pH to 8.0

MINERAL RECOVERY SYSTEM FOR DESALINATION

RELATED APPLICATIONS

This application claims the benefit of the filing date of U.S. Provisional Application Ser. No. 60/937,041, filed on Jun. 25, 2007.

FIELD OF THE INVENTION

The invention relates to a method and system of recovering minerals from a concentrated brine expelled from a water desalination system, and of further removing ice/water therefrom.

BACKGROUND OF THE INVENTION

Various types of minerals are found in seawater. The typical composition of seawater includes a significant amount of sodium chloride, as well as potassium chloride, calcium chloride, magnesium sulfate, magnesium chloride, sodium bicarbonate, etc. Sodium chloride has many known uses; the other minerals found in seawater also have various uses. Magnesium sulfate and its hydrates, for example, can be used as a fertilizer. Potassium nitrate can be used to produce not only fertilizer, but also products in the glass, enamel, and ceramics industries, as well as for manufacturing explosives and pyrotechnics, etc. Minor applications are also found in the cement, sugar, and aluminum industries.

In many areas of the world, such as where fresh drinking water is not readily available, desalination methods and systems are used to produce fresh drinking water. There are many types of desalination methods and systems available, such as those described in Applicants' U.S. application Ser. No. 11/731,717, filed Mar. 30, 2007, entitled "Desalination Method and System Using Compressed Air Energy Systems." One of the objectives of the above described system is the production of fresh drinking water by removing the minerals, impurities and contaminants therein using a modified Eutectic Freezing Crystallization (EFC) method of desalination. While this system was previously designed to remove the minerals, impurities and contaminants, it was not specifically designed to collect and salvage the valuable minerals in a cost efficient way. Heretofore, systems designed to remove minerals and collect and utilize them for commercial purposes and industry has not been developed.

SUMMARY OF THE INVENTION

The present invention generally comprises the incorporation of a mineral recovery system in conjunction with a desalination system, such as the one shown and described in U.S. application Ser. No. 11/731,717, filed Mar. 30, 2007, entitled "Desalination Method And System Using Compressed Air Energy Systems," and/or U.S. application Ser. No. 11/585,023, filed Oct. 23, 2006, entitled "Thermal Energy Storage System Using Compressed Air Energy And/Or Chilled Water From Desalination Processes," which are incorporated herein by reference in their entirety. The present method and system can also be used in conjunction with other desalination systems that produce concentrated brine as a byproduct, from which minerals and additional ice/water can be removed and recovered.

The invention is preferably adapted to be used in association with a desalination system that comprises a compressed air energy storage system that produces chilled air as a byproduct when the compressed air is released. The desalination system preferably desalinates seawater or other brackish water (hereinafter collectively "seawater") by spraying tiny droplets of seawater under pressure into a crystallization chamber, wherein the super chilled air from the compressed air storage system is introduced into the chamber to cause the droplets to flash freeze, and then land at the bottom of the chamber, forming an ice/snow mass therein. As the droplets freeze, each droplet contains ice particles and concentrated brine surrounding them, as brine rejection occurs, which allows the ice particles to separate from the minerals and other impurities contained therein. The low density ice/snow mass begins to float to the top of the remaining high density brine mixture and accumulates at the bottom of the chamber. The ice particles, which are less dense, migrate to the top, and can be separated and removed from the remaining brine mixture, which is denser, and therefore, tends to remain at the bottom of the chamber. What remains is brine that contains the minerals, impurities and contaminants left behind from the seawater as the ice forms. It is this accumulated concentrated brine that is expelled from the crystallization chamber, as a byproduct, which the present invention utilizes and processes.

The present invention preferably comprises a mineral recovery system that further processes the concentrated brine left behind by the desalination system to further remove water, and to further separate and isolate the various minerals, impurities and contaminants found therein. In this manner, the objective is to be able to use the minerals derived from the system more effectively in industry and commerce.

The present invention preferably comprises a crystallization chamber in which the concentrated brine mixture from the desalination system can be introduced through a spray nozzle at or near the top, wherein super chilled air can be introduced into the chamber preferably from below the nozzles. This way, as the concentrated brine is introduced into the chamber in the form of a spray or mist, the droplets will fall and encounter an updraft of super chilled air injected into the chamber, wherein as the droplets fall and decelerate, they will begin to freeze due to the heat exchange with the reduced temperature of the chilled air. Preferably, there is at least one vent provided at or near the top of the crystallization chamber which allows the super chilled air to circulate upward through the chamber, wherein the concentrated brine mixture can be sprayed down onto the chilled air circulating upward. Preferably, the super chilled air can be obtained as a byproduct of the desalination system but it can also be provided by any other source such as a dedicated compressor and expander.

What forms as the droplets fall to the bottom of the chamber is a super chilled slurry mixture, wherein an agitator for mixing the mixture is preferably provided at or near the bottom of the crystallization chamber. The agitator preferably helps to keep the ice particles from freezing and sticking together and forming an ice block, as in the case of the desalination system, wherein the concentration of the brine also helps to prevent the ice from freezing to quickly into a mass. Once the slurry mixture forms and collects, and is agitated, it is preferably distributed to at least one stilling chamber connected to and communicating with the crystallization chamber.

Each stilling chamber preferably has a valve that controls the rate of flow of the slurry mixture into the stilling chamber. When multiple stilling chambers are provided, there is preferably a valve for each one, such that the amount and extent to which the slurry is allowed to fill each one can be independently controlled, such as by a programmed controller. Preferably, when there are multiple stilling chambers, they are located around the perimeter of the crystallization chamber, i.e., such as equidistant from the chamber, such that each stilling chamber can be filled sequentially, one after the other. That is, after the first one is filled, the valve for that stilling chamber can be closed, and then the valve for the next stilling chamber can be opened, to begin filling that chamber, and this can be done repeatedly, around the crystallization chamber, to fill each stilling chamber, one by one, in this manner, wherein by the time the cycle has completed, i.e., the first stilling chamber has finished processing its slurry and has been emptied of its slurry, the valve for that stilling chamber can then be opened again, and more slurry from the crystallization chamber can begin filling that stilling chamber. In such case, the sequence will have made its way all the way around the cycle which can then be repeated in this manner.

Each stilling chamber preferably has an inlet for introducing the slurry from the crystallization chamber such as near the top, along with at least one outlet for draining leftover brine near the middle of the chamber, and at least one outlet for draining any leftover sludge at the bottom thereof. At the bottom, but above the sludge outlet, there is preferably an agitator for mixing the slurry within the stilling chamber, wherein a paddle that extends close to the wall and/or floor of the stilling chamber is preferably provided. Accordingly, as the slurry is mixed, and agitated, the densest "sludge" within the slurry will tend to sink to the bottom, wherein the sludge can then be drained from the bottom of the chamber through the bottom outlet.

From there, the sludge mixture can then be distributed through a pipe to a sludge storage tank, which can be emptied periodically to collect the minerals, impurities and contaminants contained therein. At the same time, the concentrated brine leftover in the stilling chamber can also be drained via the middle outlet, and from there, the mixture can be distributed through another pipe into a brine storage tank, which can also be emptied periodically, or rerouted into the crystallization chamber, if desired.

In each stilling chamber, there is preferably at least one strainer for removing ice particles therefrom located at the top of the chamber, which can be lowered and raised within the slurry contained therein. The strainer preferably comprises multiple V shaped railings that can be lowered into the slurry to enable the ice particles within the slurry mixture to float vertically upward between the railings and through the strainer toward the top of the stilling chamber. Then, as the ice particles begin to agglomerate together at the top, they tend to form a relatively large mass that floats atop the slurry. And, because the mass that forms is bigger than the ice particles, the ice mass will be capable of being lifted out of the slurry by raising the strainer. The railings in such case can lift the ice mass out of the slurry and the stilling chamber, and from there, the ice mass is preferably allowed to slide down the railings and onto an associated trough located adjacent the stilling chambers.

The trough is preferably another V shaped longitudinally extended vessel onto which the ice particles and ice mass removed from the stilling chamber by the strainer can be placed. The shape of the trough allows the ice to be held thereon and melt, wherein the melted water can travel toward an associated water storage tank connected to the trough for storing the fresh water produced thereby. The trough is preferably extended around the outside perimeter of the stilling chambers such that as each stilling chamber cycles through and processes the slurry and dumps out more ice, the ice can be transported by the trough, wherein the ice can melt and be distributed to the water storage tank.

This process of removing water from the slurry facilitates further removal of minerals, impurities and contaminants found in concentrated brine. The sludge, in particular, by virtue of the phase diagram, as will be discussed, contains various minerals in solid crystal form, which can easily be removed from the liquid using any conventional filter. There are also impurities and contaminants that must be removed, including organics, boron, metals, and micro-pollutants, etc., to produce pure water.

DETAILED DESCRIPTION OF THE INVENTION

The present method and system is designed to be used in conjunction with desalination systems such as described in U.S. application Ser. No. 11/731,717, filed Mar. 30, 2007, entitled "Desalination Method And System Using Compressed Air Energy Systems," and U.S. application Ser. No. 11/585,023, filed Oct. 23, 2006, entitled "Thermal Energy Storage System Using Compressed Air Energy And/Or Chilled Water From Desalination Processes," which are incorporated herein by reference in their entirety. The present method and system can also be used in conjunction with other desalination systems that produce concentrated brine as a byproduct, from which minerals and additional ice/water can be removed and recovered.

The invention is preferably adapted to be used in association with a desalination system that comprises a compressed air energy storage system that produces chilled air as a byproduct when the compressed air is released. The desalination system preferably desalinates seawater by spraying tiny droplets under pressure into a crystallization chamber, wherein the super chilled air from the compressed air storage system is introduced into the chamber to cause the droplets to flash freeze, and then land at the bottom of the chamber, forming an ice/snow mass therein. As the droplets freeze, each droplet contains ice particles and concentrated brine surrounding them, as brine rejection occurs, which allows the ice particles to separate from the minerals and other impurities and contaminants contained therein. The ice/snow mass begins to float to the top of the remaining brine mixture and accumulates at the bottom of the chamber. The ice particles, which are less dense, migrate to the top to form an ice mass, and can be separated and removed from the remaining brine mixture, which is denser, and therefore, tends to remain at the bottom of the chamber.

As the desalination system produces fresh drinking water in the form of ice/snow, the seawater becomes increasingly concentrated. For example, while seawater may start out with a 3% concentration of (sodium chloride) NaCl, the remaining brine after desalination may contain up to 23% NaCl, i.e., typically between 20% to 23% by weight. And as the ice/snow is removed, and the percentage of fresh water brine decreases, the percentage of the minerals, impurities and contaminants in the brine increases. It is this accumulated concentrated brine that is expelled from the crystallization chamber, as a byproduct, which the present invention utilizes and processes.

Figures 13, 14:
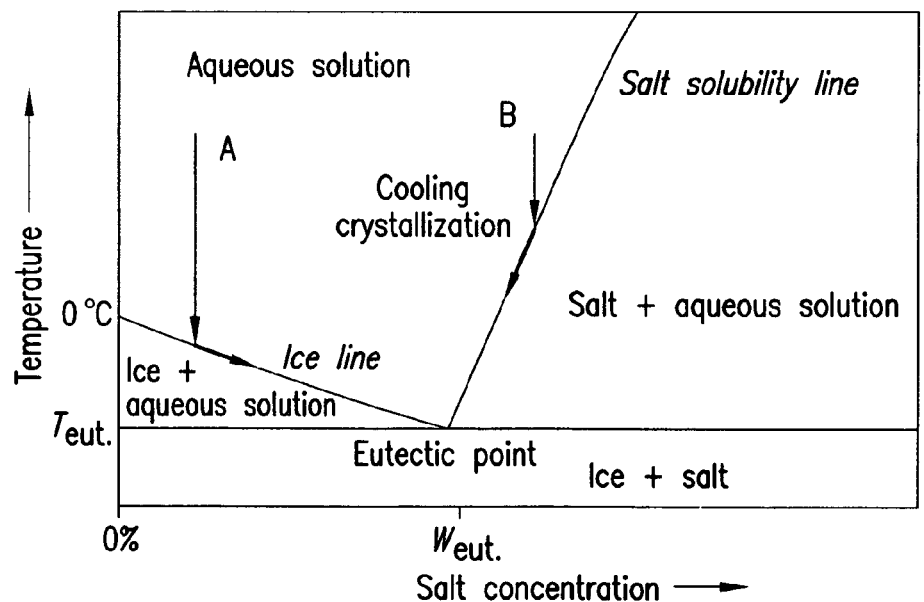
FIG. 13 shows a standard seawater composition chart.
FIG. 14 shows a phase diagram showing the ice line and salt solubility line, as well as the eutectic point for a salt aqueous solution.

In seawater, there can be various types of minerals, as well as impurities and contaminants therein. FIG. 13 shows the typical composition of standard seawater, which contains a significant amount of sodium chloride, but also potassium chloride, calcium chloride, magnesium sulfate, magnesium chloride and sodium bicarbonate. Sodium chloride has its known uses, but the other minerals found in seawater can also be used. Magnesium sulfate and its hydrates, for example, can be used as a fertilizer. Moreover, further cooling and processing of seawater can produce potassium nitrate, which can be used to produce not only fertilizer, but also products in the glass, enamel, and ceramics industries, as well as for manufacturing explosives and pyrotechnics, etc. Minor applications are also found in the cement, sugar, and aluminum industries. There are also impurities and contaminants that must be removed, including organics, boron, metals, and micro-pollutants, etc., to produce pure water.

As disclosed in Applicant's above referenced patent applications, it has been found that a Eutectic Freezing Crystallization (EFC) method of desalination is an effective way to remove minerals, impurities and contaminants from seawater. In this respect, as the seawater cools and begins to freeze, the pure water portion of the seawater begins to form a crystalline solid structure, i.e., ice, which has almost no solubility properties for the solutes contained in the seawater. In this case, the water is considered to be the solvent, and the dissolved substances, i.e., minerals, are considered to be the solutes. As solid ice forms, and separates from the liquid seawater, the solutes are confined to the liquid portion of the seawater, which gradually becomes more concentrated, as more ice forms. Increasing the concentration of the solute then lowers the freezing point of the liquid, and therefore, additional cooling is required to continue to form ice. Then, as cooling continues, the solubility limit of the solution will eventually be reached, leading to the precipitation of the solutes. These events are succinctly described by the phase diagram shown in FIG. 14.

As shown in FIG. 14, pure water freezes at 0° C., but the freezing point can be lowered by dissolving a solute, such as salt, in the water. If the solution is then cooled to below the freezing point, water crystals (i.e. ice) will start to form. As a result, the remaining saline solution becomes further concentrated, until the saturation point is reached. This intersection of the freezing point line and the saturation point line is referred to as the eutectic point. Below the eutectic point, salt crystals will be formed in addition to water crystals.

When the solution freezes, the water molecules tend to form the most stable crystal arrangement if there are no foreign particles present. When a salt/water solution is cooled to the freezing point, the pure water molecules begin to form ice crystals that tend to exclude particles that are unlike the ice crystals. For example, as salt water freezes, salt is excluded, i.e., which is called brine rejection. This is because salt has a different crystalline structure: salt forms cubic crystals (with four sides) whereas ice is hexagonal, or six-sided. Among all the molecules in a volume of cold, salty water, there are sure to be instances where several water molecules are positioned next to each other, away from any $Na^+$ or $Cl^-$ ions, wherein the water molecules begin to stick together, while the molecules with $Na^+$ or $Cl^-$ ions are less likely to stick, or stay stuck. This allows fresh water ice crystals, and some slightly saltier liquid water, to form.

There are 13 different crystal formations of frozen water depending upon the extent of the cold temperatures involved in forming the ice. Some of the crystal formations are quite porous and will permit liquids to flow through the open channels, which allows the dense concentrated brine liquid to separate and flow down and away from the ice. There is also a significant density difference between the ice, the water and the solid salt particles that are formed. This special property of water is put to good use in the EFC process, i.e., as salt crystals form near the eutectic point, they tend to sink to the bottom of the liquid solution, while the ice crystals tend to rise to the surface. The result is separation by physical means, allowing the two components of the solution to be readily isolated.

According to the phase diagram shown in FIG. 14, there are two paths that can be used to achieve eutectic freeze crystallization, which are indicated by A and B. In the case of method A, the seawater or aqueous solution is cooled until the ice line is reached and ice crystals begin to form. As cooling continues, and more ice is formed, the ice fraction increases and the solution becomes more concentrated, until the maximum solubility of the solute is reached. At this concentration and temperature, the solution is called eutectic and further cooling results in the undesired simultaneous formation of ice and salt as separate solid crystals.

In the case of method B, at the starting point, the initial solute concentration is higher than the eutectic concentration, which, for salt, is about 23.3%. Then, as the solution is cooled, the salt solubility line is reached and salt crystals are thereby formed. Continued cooling results in the production of more salt crystals and a decrease of the temperature until the eutectic temperature is reached. From this moment on, both ice and salt crystals are formed.

Figure 15:
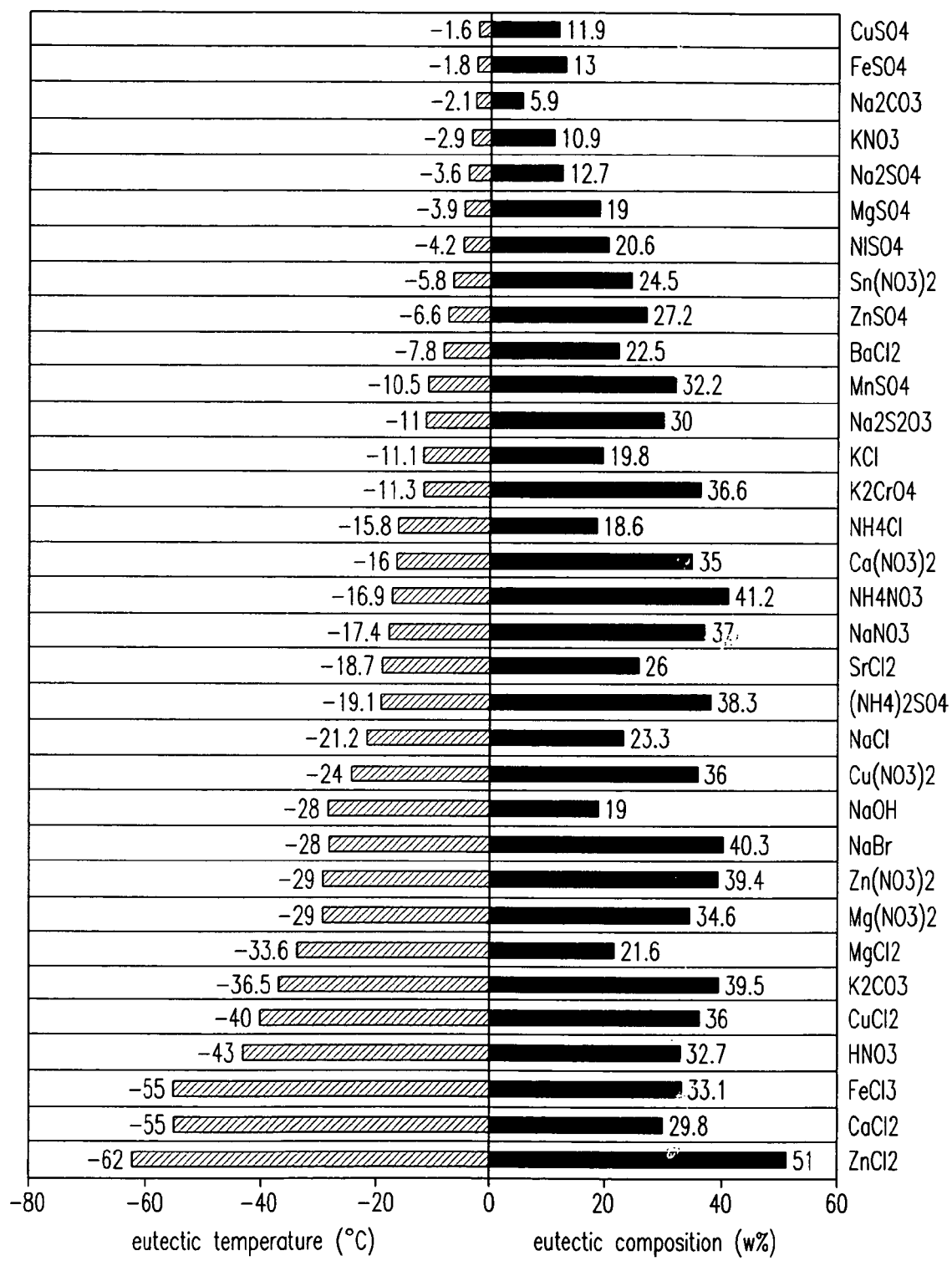
FIG. 15 shows the eutectic temperatures and eutectic composition or concentration levels for different mineral compositions and mixtures.

FIG. 15 shows that the eutectic temperatures and eutectic composition or concentration levels are different for different mineral mixtures. For example, it can be seen that for a water-NaCl mixture, the eutectic temperature is minus 21.2 degrees C., and that the eutectic concentration is 23.3% by weight. What this means is that at the eutectic concentration of 23.3%, if the solution is above minus 21.2 degrees C., it will remain a liquid, and if the solution is cooled to below minus 21.2 degrees C., it will begin to form both ice and salt crystals.

On the other hand, as shown by the phase diagram of FIG. 14, if the solution's concentration is lower than the eutectic concentration, i.e., less than 23.3%, ice will begin to form at relatively higher temperatures, i.e., as long as the temperature is below the ice line, depending on the concentration level of the brine. At the same time, if the solution's concentration is higher than the eutectic concentration, i.e., more than 23.3%, salt crystals will begin to form at a higher than eutectic temperature, i.e., as long as the temperature is below the salt solubility line. Additional changes with additional phase boundaries will also occur, as will be discussed.

It can also be seen that for other minerals, such as MgSO4, another common mineral found in seawater, the eutectic temperature and concentration levels are different, i.e., the eutectic temperature is minus 3.9 degrees C., and the eutectic concentration is 19%. What this means is that if the solution is at the eutectic concentration of 19%, and above minus 3.9 degrees C., it will remain a liquid, and, if it is cooled to below minus 3.9 degrees C., it will begin to form both ice and mineral solids. On the other hand, if the solution's concentration is lower than the eutectic concentration, i.e., less than 19%, ice will begin to form at a higher than eutectic temperature, i.e., above minus 3.9 degrees C., as long as the temperature is below the ice line, depending on the concentration level of the mixture. At the same time, if the concentration is higher than the eutectic concentration, i.e., more than 19%, solid mineral particles will form at a higher temperature, i.e., as long as the temperature is below the salt solubility line.

Experiments have shown that very high crystal purities can be achieved by means of eutectic freeze crystallization. In fact, case studies for industrial applications demonstrate that EFC processes are an energy efficient alternative to conventional crystallization techniques using evaporation. The main cause of the lower energy consumption is the fact that the latent heat of crystallization for water is a factor of 6.8 lower than the latent heat of evaporation. An important aspect for the energy-efficiency of an EFC process is the eutectic temperature of the aqueous solution. This temperature mainly determines the evaporation temperature of the refrigeration cycle and low evaporation temperatures result in low cycle efficiencies. According to some experts, an EFC process operating at a eutectic temperature of minus 1.5 degrees C. requires about 70% less primary energy than a triple stage evaporation process. For a system with a eutectic temperature of minus 18.1 degrees C., this reduction is smaller but still 30%. The application of high pressures to form clathrates instead of ice can increase the energy efficiency of eutectic freeze crystallization further.

One needs to orchestrate a series of separate distillations to remove each different solute when there are several solutes in the water solution.

Figure 1:
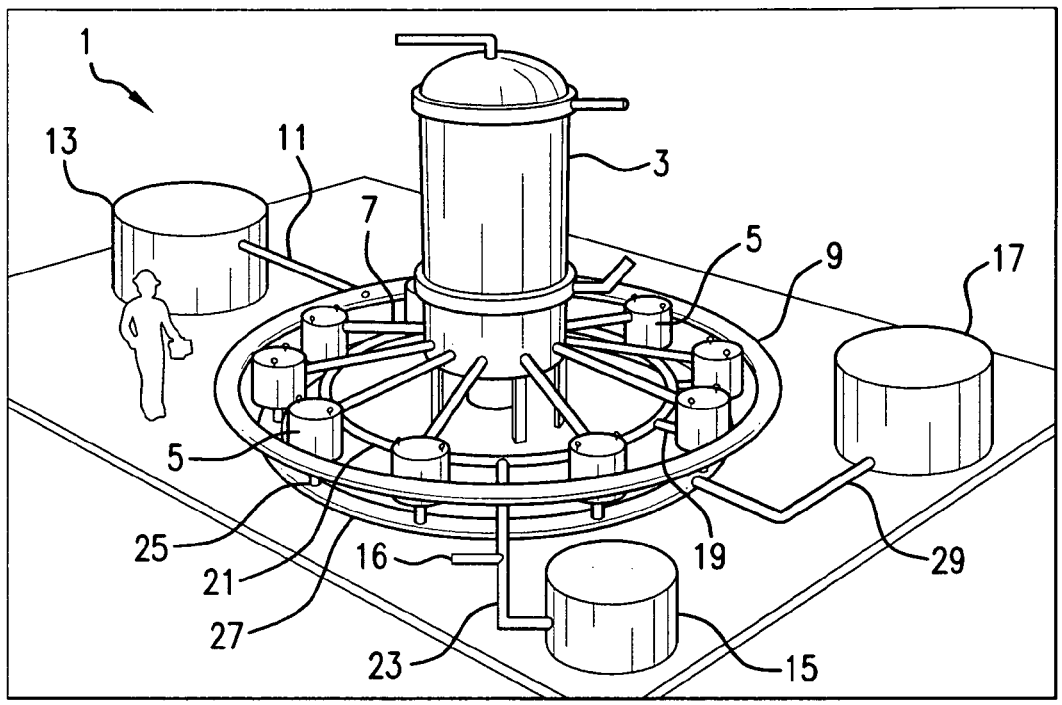
FIG. 1 shows an overall isometric view of the mineral recovery system of the present invention showing a crystallization chamber in the center, along with multiple stilling chambers extending around it, in the form of a circle, as well as a storage tank for brine, one for sludge, and another for fresh water.

The details of the apparatus used to process the concentrated brine will now be discussed. As shown in FIG. 1, the mineral recovery system 1 preferably comprises a main chamber 3, with multiple stilling chambers 5 connected thereto, as well as pipes 7 extending from the main chamber 3 to the stilling chambers 5.

Figure 2:
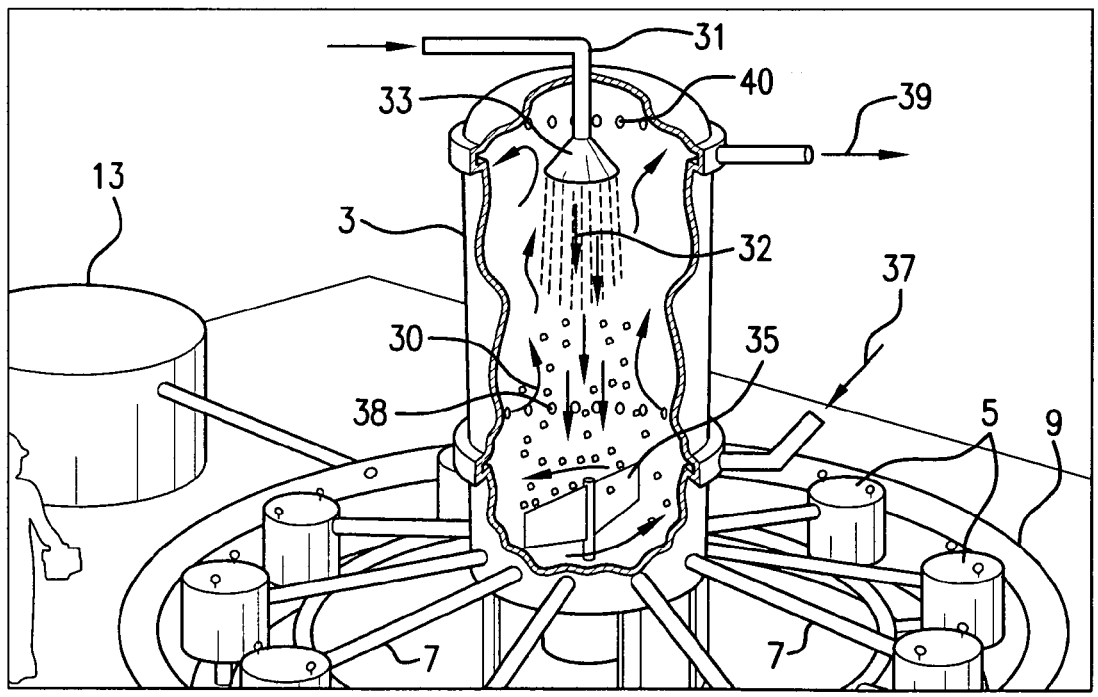
FIG. 2 shows an isometric view of the mineral recovery system of the present invention showing the inside of the crystallization chamber, including a spray nozzle and vent holes at the top, as well as inlets and an agitator near the bottom, showing the falling seawater droplets falling and mixing with the super chilled air entering the chamber through the inlets.

As shown in FIG. 2, main chamber 3 preferably comprises an insulated crystallization chamber similar to those described in the previous patent applications identified above. On top of main chamber 3 is preferably an inlet pipe 31, which transports the concentrated brine produced by a desalination system, such as those described in Applicant's previously filed patent applications, into main chamber 3. A pressure source is preferably provided, which places the concentrated brine flowing through pipe 31 under pressure, so that it can be released through a spray nozzle 33, located near the top of main chamber 3, to form tiny droplets of concentrated brine that can be introduced into chamber 3, as shown.

As can be seen, main chamber 3 forms an internal space into which the tiny droplets of concentrated brine can be introduced as a spray, from above, as shown by arrows 32. At the same time, main chamber 3 preferably has inlets or other means for introducing super chilled air, shown by arrows 30, into main chamber 3, to expose the droplets to extremely cold temperatures. Preferably, the concentrated brine droplets enter from above, and the chilled air enters from below and is blown upward against the direction of the falling droplets to give the droplets the maximum residence time in the chamber, although not necessarily so.

As discussed in the previous applications, main chamber 3 can be adapted with either a counter flow, where chilled air flows upward against the direction of the falling droplets, or a co-flow, where chilled air flows in the same direction as the falling droplets. The factors discussed in the previous applications in connection with the desalination chamber can be used to determine which arrangement is best suited for any particular application in connection with the present system 1.

The chilled air is preferably obtained from desalination, i.e., as a byproduct from the compressed air system releasing air under pressure to produce extremely cold air via a turbo expander. The chilled air can be drawn from the original crystallization chamber, as a byproduct of producing desalinated seawater, or, it can be generated in the first instance by the turbo expander associated with the desalination system. The second option is especially appropriate when extremely cold temperatures are required or desired. Any other source for chilled air is also contemplated.

Chilled air is preferably introduced into main chamber 3 through inlet pipe 37, and through a series of inlet openings 38 within main chamber 3 located near the bottom thereof, but above the expected slurry level at the bottom of chamber 3. Vents or openings 40 are preferably provided at or near the top of main chamber 3 so that after the chilled air enters into chamber 3, it can be circulated upward and then exhausted through openings 40, and then out through outlet 39.

As is the case with the desalination system, inside the crystallization chamber, i.e., main chamber 3, the droplets are exposed to extremely cold temperatures and are preferably substantially flash frozen while they float down from the top to the bottom. Residence time in the air can be affected and controlled by the relative velocities of the droplets coming down, and the chilled air blowing up. But as will be discussed later, because the brine used in this system has a much higher concentration level of salt, and based on appropriate temperature controls, the droplets preferably will not completely freeze, and instead, will tend to leave more of the concentrated brine liquid around the surface of the droplets. Accordingly, when the droplets eventually fall to the bottom of main chamber 3, rather than accumulating to form an ice/snow mass, as in the case of the desalination system, they form more of a slush or slurry mixture.

As shown in FIG. 2, to ensure that the slush or slurry mixture does not freeze too quickly and form an ice/snow mass, an agitator 35 is preferably provided at the bottom of main chamber 3, to continually mix the slurry, which helps to keep the slurry from freezing, and maintains the slurry in a substantially liquid, although slushy, form. Agitator 35 is preferably a paddle-like member that can be rotated by a motor, and has blades that extend almost to the inside surface of main chamber 3, to ensure that there are no dead-space regimes within the bottom of chamber 3. The walls of main chamber 3 are preferably lined with a coating to permit easy relative motion between the wall surface and slurry mixture.

As the slurry collects at the bottom of main chamber 3, and is agitated by agitator 35, the depth of the slurry is preferably monitored. When the mixture reaches a predetermined height within main chamber 3, one or more valves is/are preferably opened, as will be described in more detail below, which allows a predetermined amount of slurry mixture to vacate main chamber 3, to maintain the level of the slurry in main chamber 3 at a relatively constant level, i.e., below a predetermined maximum. This is done by allowing a predetermined amount of slurry to be removed from main chamber 3, via pipes 7, and circulated into stilling chambers 5.

A valve (not shown) is preferably provided at the entry of each pipe 7, which is adapted to be opened and closed, one at a time, to allow a predetermined amount of slurry mixture to drain out and be removed from main chamber 3, into one or more associated stilling chambers 5. The system 1 is preferably adapted such that a single valve can be opened at any given time, to allow a predetermined amount of slurry to be removed at a predetermined rate, into one associated stilling chamber 5.

The main chamber 3 is preferably centered among stilling chambers 5, such that the distance between main chamber 3 and each stilling chamber 5, and therefore, of pipes 7, is the same with respect to each stilling chamber 5. In this embodiment, there are preferably ten stilling chambers 5 extended in a circular wheel-like pattern around main chamber 3, wherein pipes 7 form spoke-like members extending from main chamber 3 to each stilling chamber 5. Although ten stilling chambers 5, are shown in this embodiment of FIG. 1, it can be seen that any number of stilling chambers can be used, depending on the factors to be discussed.

The system 1 is preferably adapted so that an appropriate amount of slurry can be removed and transported into the associated stilling chambers 5, by opening the appropriate valve, one by one, to maintain the amount of slurry in main chamber 3 substantially constant. In this respect, as soon as one stilling chamber 5 fills up, the valve on pipe 7 for that stilling chamber 5 is preferably closed, and then, another valve for the next adjacent pipe 7, feeding into the next adjacent stilling chamber 5, is preferably opened, to allow the slurry to begin filling that next adjacent stilling chamber 5. This preferably continues, from one valve to the next, and from one stilling chamber 5 to the next, filling up each stilling chamber 5, one by one, around the perimeter, to help keep the level of the slurry in the main chamber 3 relatively constant.

At the same time, while the stilling chambers are being filled, the slurry mixture in each stilling chamber 5 is preferably processed to remove additional ice/snow and recover the minerals therein, as will be discussed, and this process is preferably accomplished during a predetermined amount of time, and at a predetermined rate, within each stilling chamber 5. This allows each stilling chamber 5 to complete the cycle and process the slurry that it contains, as will be discussed, so that each can be emptied and is ready to receive more slurry mixture from main chamber 3, by the time the cycle has gone all the way around. That is, as each valve opens, and closes, and as each stilling chamber 5 fills up, and processes its slurry, the sequence around the perimeter will eventually make its way around, wherein, by the time one full revolution has been completed, the first stilling chamber 5 to be filled will then be empty again and ready to receive more slurry.

Accordingly, it can be seen that the timing and sequence of opening and closing the valves, and of filling and emptying the stilling chambers 5, and processing the slurry, as well as determining the number, size and processing rate of the stilling chambers 5, are preferably predetermined based on the size of the main chamber 3, and the throughput of brine that can be treated and processed by the system. The processing time for each stilling chamber 5 is preferably equivalent or slightly below the time it takes for all of the stilling chambers 5 to be filled up with slurry, one by one, around the perimeter, as the level of the slurry remains substantially constant in main chamber 3. This way, by the time the sequence, of opening and closing the valves, makes one full revolution around main chamber 3, the stilling chamber 5 that the sequence started with will be empty and ready to accept more slurry. This cycle preferably continues, and repeats itself, by processing the slurry, from one stilling chamber 5 to the next, continuously without stopping.

Figure 3:
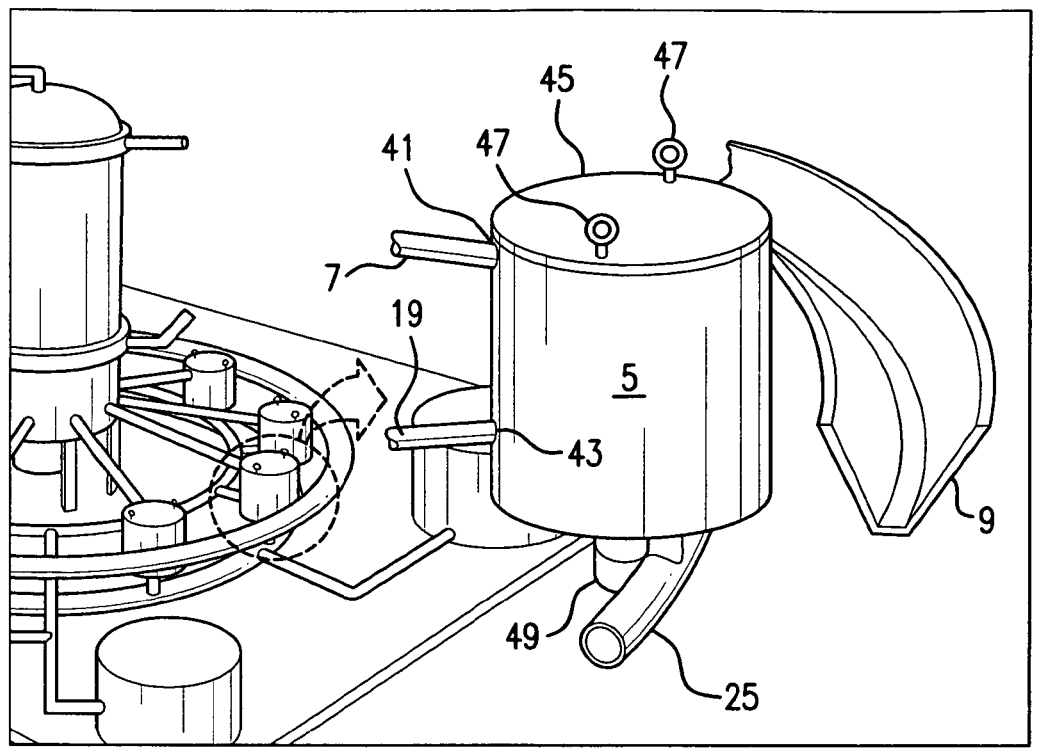
FIG. 3 shows an isometric view of one stilling chamber of the mineral recovery system of the present invention in its closed position.

The process by which stilling chambers 5 operate to remove ice/snow and recover minerals from the brine will now be discussed in association with FIGS. 3-12. As seen in FIG. 3, each stilling chamber 5 has an entry point 41, connected to pipe 7, through which the slurry mixture from main chamber 3 is introduced. There is also preferably a brine outlet 43, which distributes the residual brine left over in stilling chamber 5 into second pipe 19, which leads to central pipe 21, and then to brine storage tank 15. Likewise, there is preferably sludge outlet 25, at the bottom of each stilling chamber 5, which distributes the left over sludge at the bottom of each stilling chamber 5 into second central pipe system 27, and then to sludge storage tank 17. FIG. 3 also shows a lid 45 with two lifting hooks 47, as well as a mixing motor 49, at the bottom, for agitator 55 shown in FIG. 4, and trough 9 adjacent thereto.

Figure 4:
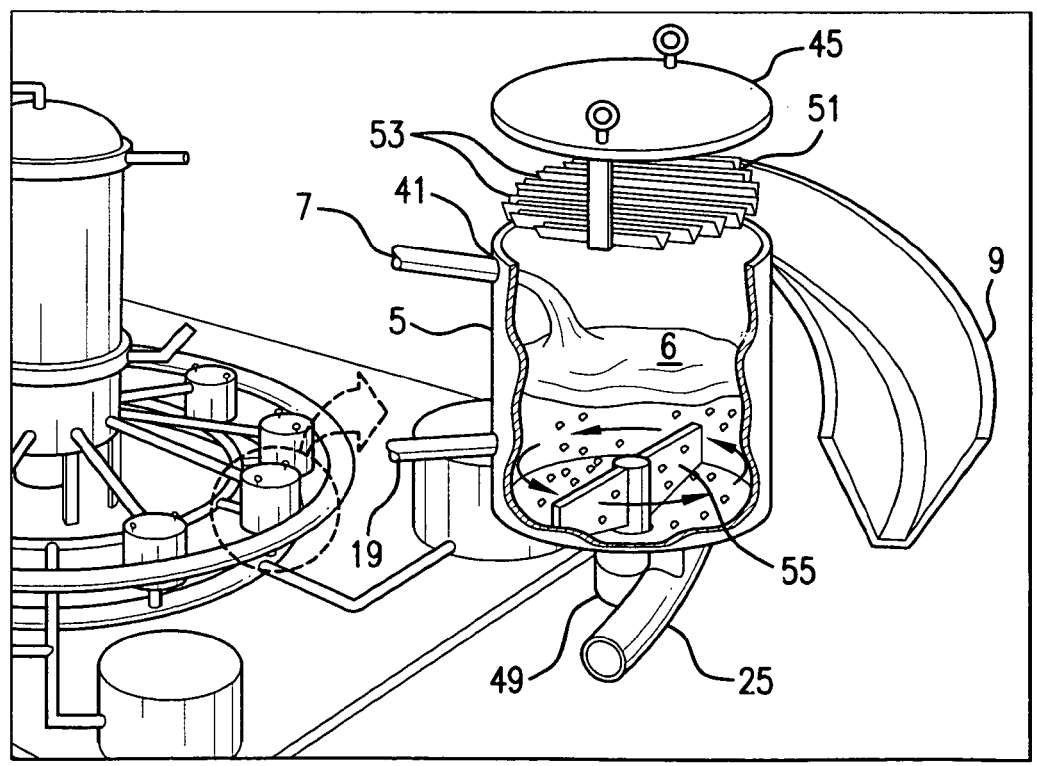
FIG. 4 shows an isometric cutout view of the stilling chamber of FIG. 3, wherein with the valve open, the slurry is being allowed to be introduced into the stilling chamber, with the agitator rotating and the strainer lifted in its open position.

FIG. 4 shows the inside of stilling chamber 5, with the slurry mixture 6 pouring into chamber 5, through entry point 41. It also shows a strainer 51 extending down from lid 45, which has multiple V-shaped railings 53, spaced apart. Strainer 51 could also be made with virtually any type of perforated surface to allow liquid to drain down, if desired. Strainer 51 is shown in its raised position, above the level of the slurry, and above entry point 41, which is the position it stays in as chamber 5 fills. At the bottom of each stilling chamber 5 there is preferably another agitator or paddle 55, operated by motor 49, which preferably mixes the slurry 6 while the stilling chamber 5 fills. Paddle 55 preferably extends almost to the inside surface of chamber 5, to avoid any dead-space regimes therein, and has a coating thereon, to permit free movement between the slurry and walls.

Figure 5:
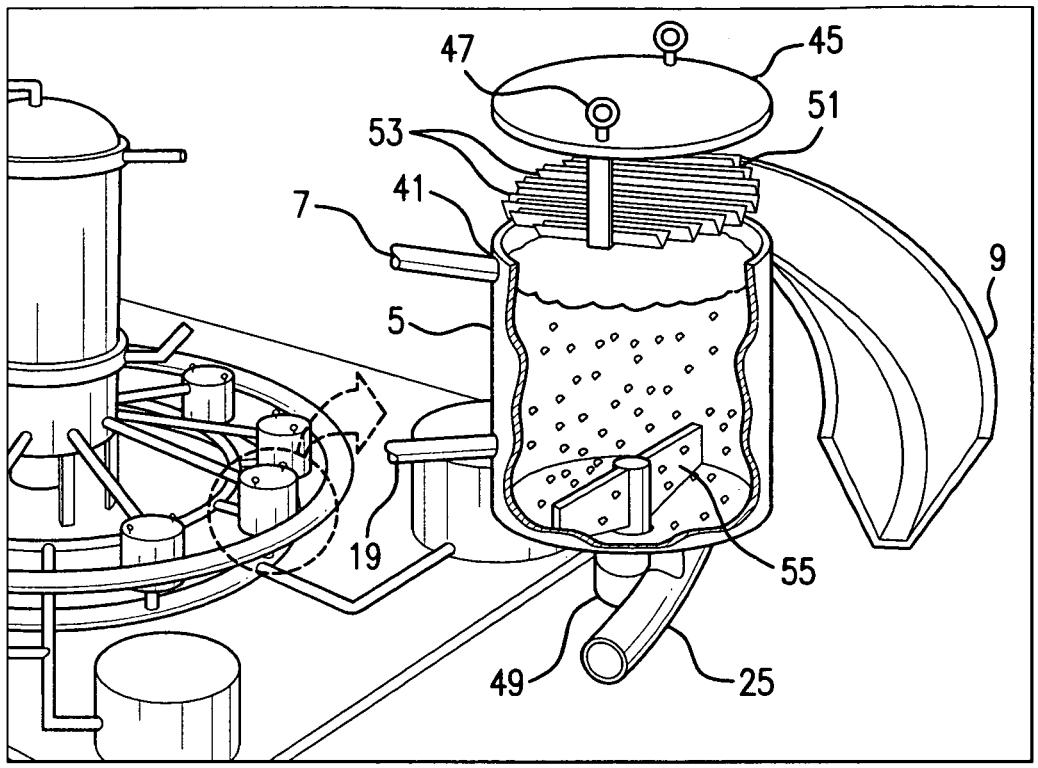
FIG. 5 shows an isometric cutout view of the stilling chamber of FIG. 3, wherein the slurry has been allowed to fill the stilling chamber, and the ice particles are beginning to rise, with the strainer lifted in its open position.

FIG. 5 shows the inside of the stilling chamber 5, with the slurry mixture therein filled to near the top of chamber 5, which is when the valve is closed, and when the next stilling chamber begins to fill. It also shows paddle 55 has stopped rotating, which allows the slurry mixture to begin to settle. At this point, the strainer 51 and lid 45 are maintained in their raised position, above the level of the slurry. The slurry is allowed to settle for a sufficient amount of time, necessary to create the appropriate gradient, as will be discussed. At this juncture, the preferred temperature of the slurry mixture can be about minus 10 degrees C., which allows for the proper layered gradient to form, although it can be colder, to allow more ice to form, if desired. This depends on the concentration level of the minerals in the slurry being introduced.

Figure 6:
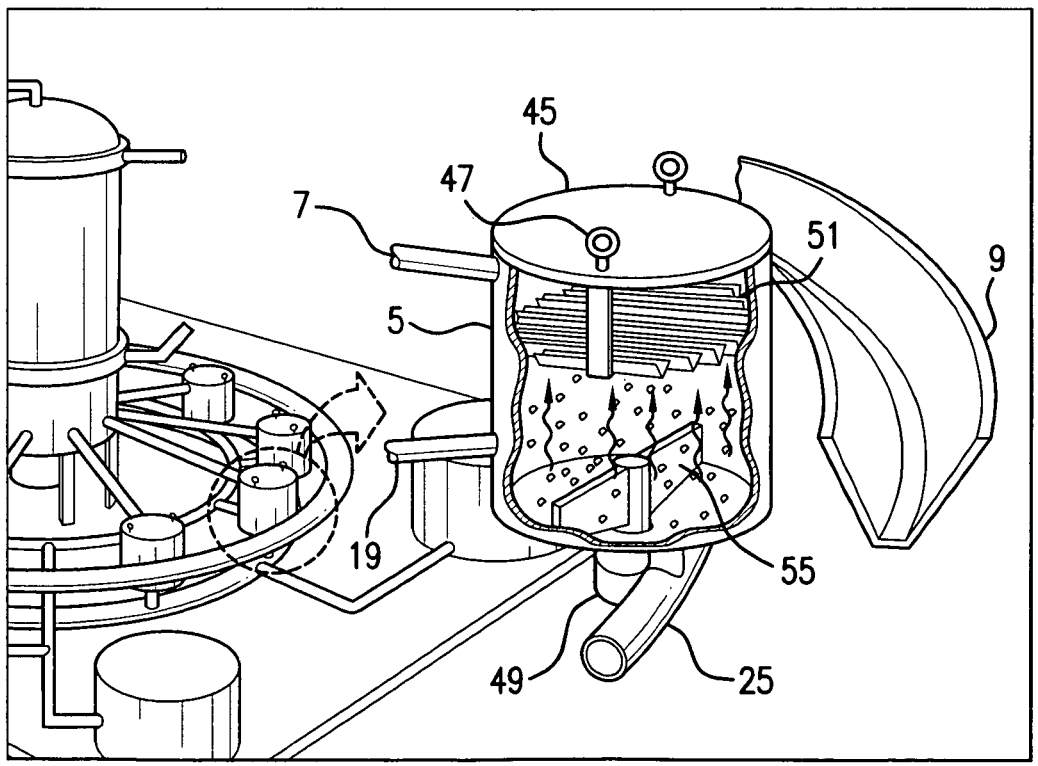
FIG. 6 shows an isometric cutout view of the stilling chamber of FIG. 3, wherein the strainer has been lowered into the slurry, and the ice particles are being allowed to rise through the railings of the strainer and toward the top of the slurry.
Figure 7:
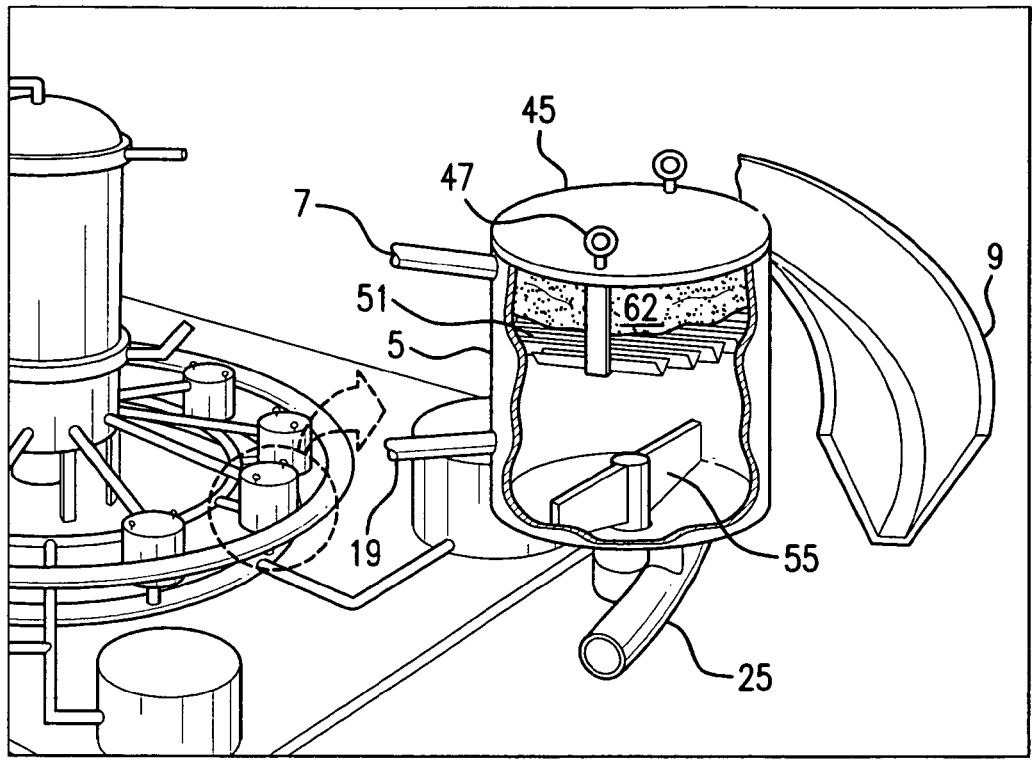
FIG. 7 shows an isometric cutout view of the stilling chamber of FIG. 3, wherein the strainer is maintained within the slurry, and the ice particles have formed an ice mass atop the slurry.

FIG. 6 shows the inside of stilling chamber 5, with strainer 51 lowered and lid 45 closed. In this position, strainer 51 extends below the upper surface of the slurry, by a predetermined amount. Then, as the ice/snow particles within the slurry begins to migrate upward, i.e., because ice is less dense than the brine, they tend to rise upward between the spaced apart railings 53 in strainer 51, and float to the top, above railings 53. Railings 53 are preferably sized and spaced apart in a manner that allows the ice particles to rise and float upward between them, but also so that the ice/snow mass, once formed, can be maintained above them. There is preferably sufficient space above strainer 51, and below lid 45, to enable a sufficiently sized ice/snow mass 62 to form therein, as seen in FIG. 7. Each railing 53 is preferably in the shape of a V, which allows the ice particles to more easily pass upward between them, but which also allows the ice/snow mass to be more easily lifted, and then removed from chamber 5, as will be discussed.

As shown in FIG. 7, as the ice particles float to the top, and with agitator 55 stopped, the ice particles begin to agglomerate and form the ice/snow mass 62 above strainer 51. At the same time, the left over brine begins to separate underneath into a gradient, based on the relative densities of the materials contained therein. The lightest or least dense materials, i.e., the ice particles, tend to float upward to the top, while at the bottom of chamber 5, the heaviest materials, such as the solid mineral crystals that may begin to form, tend to migrate to the bottom, as they tend to be denser than the brine. In between the ice/snow mass, and the solid minerals, is preferably the concentrated brine mixture.

Figure 8:
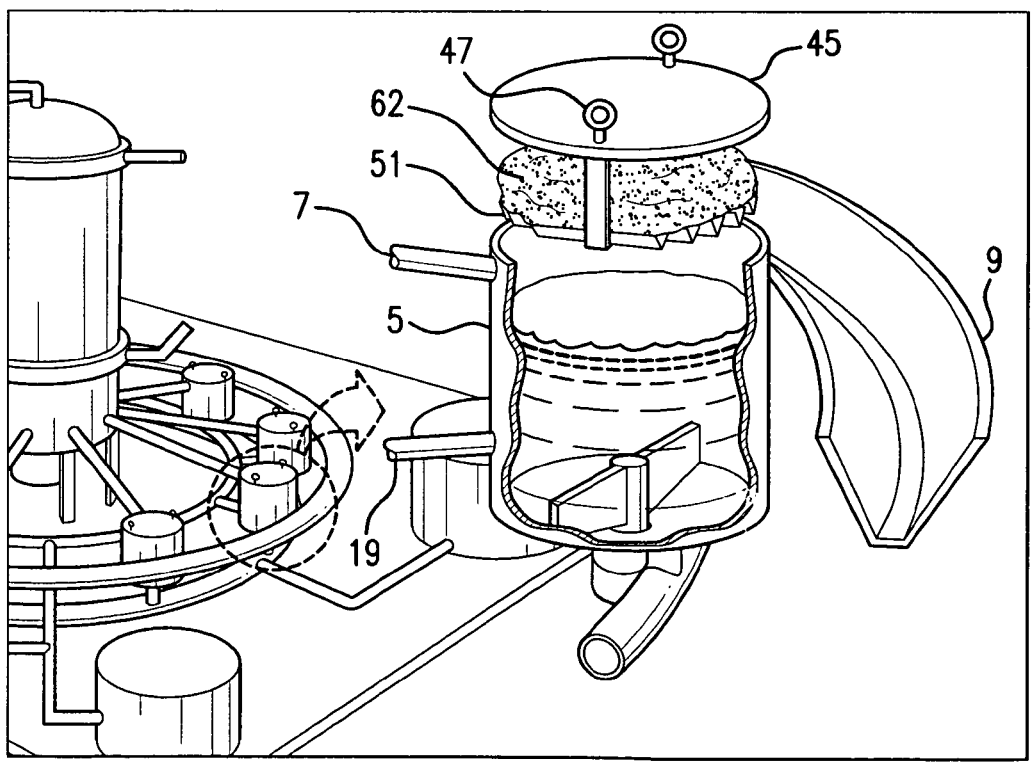
FIG. 8 shows an isometric cutout view of the stilling chamber of FIG. 3, wherein the strainer is being lifted out of the slurry, and the ice mass that has been formed is being lifted out of the slurry and out of the stilling chamber.

At this point, as shown in FIG. 8, strainer 51 and lid 45 are raised so that strainer 51 lifts the ice/snow mass 62 out of the leftover brine. This can be done mechanically by the use of hooks 47 and raising lid 45 straight up and out. Because strainer 51 has railings 53 that are spaced apart, the leftover brine tends to drain down the sides, while the ice/snow mass 62 is lifted out. This allows ice/snow mass 62 to be removed and separated from the residual brine leftover in chamber 5.

Figure 9:
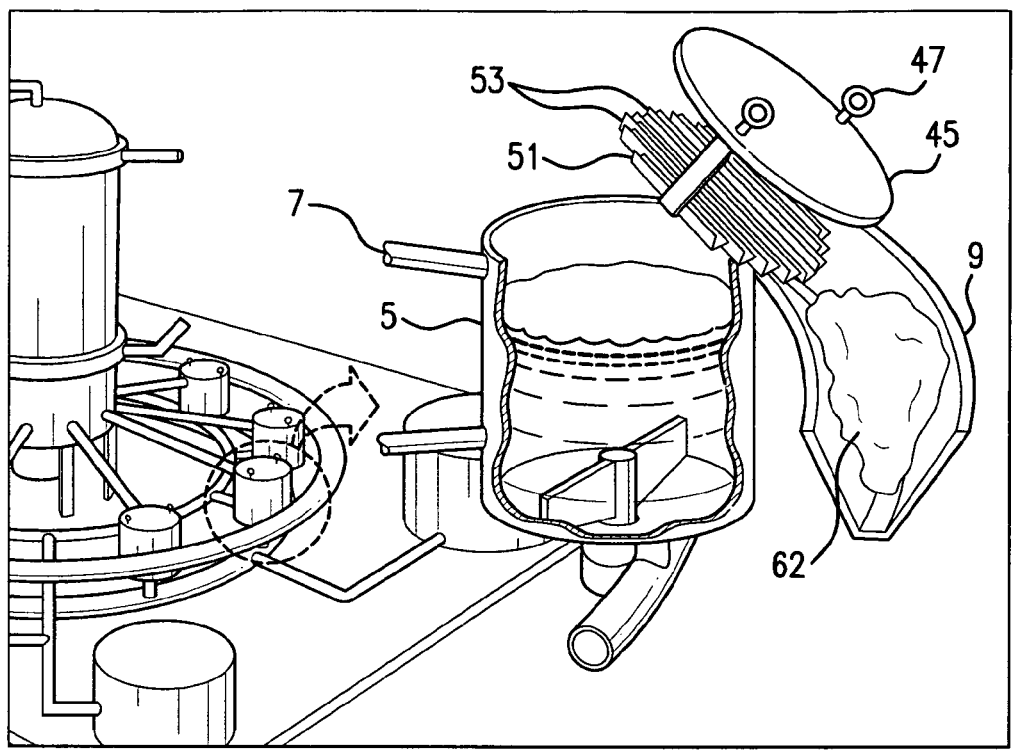
FIG. 9 shows an isometric cutout view of the stilling chamber of FIG. 3, wherein the strainer is being tilted toward the trough to allow the ice mass to slide off of the railings and be dumped onto the trough.

To remove ice/snow mass 62 from chamber 5, lid 45 and strainer 51 are preferably tilted toward trough 9, as shown in FIG. 9. Hooks 47 can be used for this purpose, and are preferably oriented transverse to railings 53, such that the V-shaped configuration of railings 53, extend longitudinally, perpendicular to trough 9, to allow ice/snow mass 62 to more easily slide along railings 53, and down onto trough 9. When ice/snow mass 62 is dumped onto trough 9, the ice/snow mass is exposed to the ambient room temperature of the surrounding air, and will begin to melt, to form pure water that travels along trough 9, toward water storage tank 13.

Figure 10:
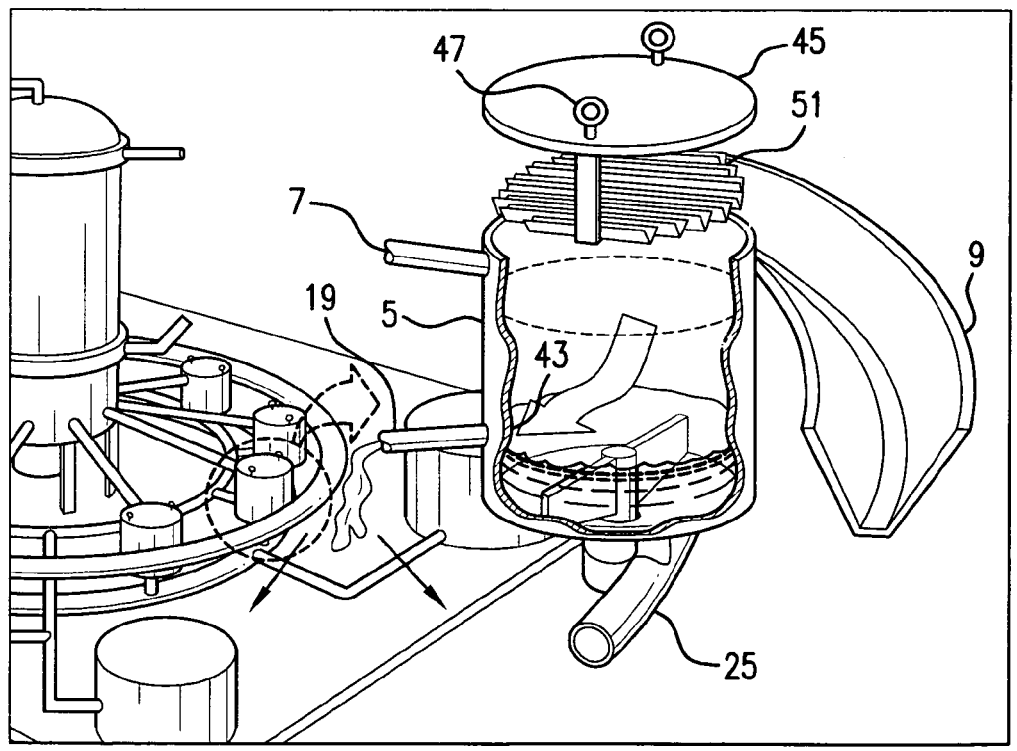
FIG. 10 shows an isometric cutout view of the stilling chamber of FIG. 3, wherein the remaining concentrated brine is shown being drained through the brine drain outlet, with the level of the brine being lowered within the stilling chamber.

As shown in FIG. 10, after the ice/snow mass 62 is dumped onto trough 9, lid 45 and strainer 51 are preferably returned to their original position over the top of chamber 5. At the same time, the residual brine leftover in chamber 5 is preferably allowed to drain out, by opening an associated valve, through exit point 43, so that the brine can be transported into pipe 19, and then, to brine storage tank 15. The brine can also be recycled, as discussed previously, and processed again, such as when it appears that more water and solutes can be removed. Exit point 43 is preferably located slightly above the bottom of chamber 5, although not necessarily so, to allow the heaviest sludge, which contains the mineral solids therein, to remain at the bottom of chamber 5, and not be swept away with the residual brine. A screen or grate can be provided at exit point 43 to keep any solids from being drained along with the brine.

Figure 11:
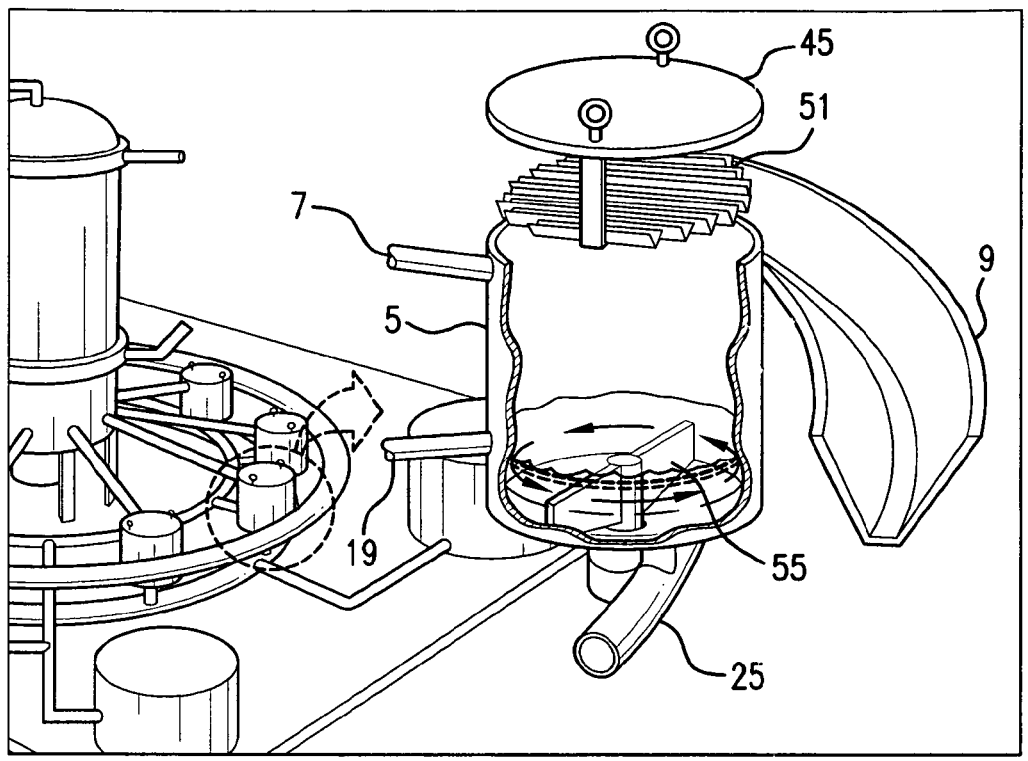
FIG. 11 shows an isometric cutout view of the stilling chamber of FIG. 3, wherein the agitator is turned back on to mix the sludge mixture collected at the bottom of the stilling chamber, wherein the sludge is drained through the sludge outlet drain.

As shown in FIG. 11, after the residual brine leftover in chamber 5 is allowed to drain out, the paddle 55 is preferably turned back on, to stir the remaining brine and sludge, which contains the mineral solids, at the bottom of chamber 5. This helps to lower the viscosity of the sludge, to allow the sludge to flow, and be transported and removed from chamber 5.

Figure 12:
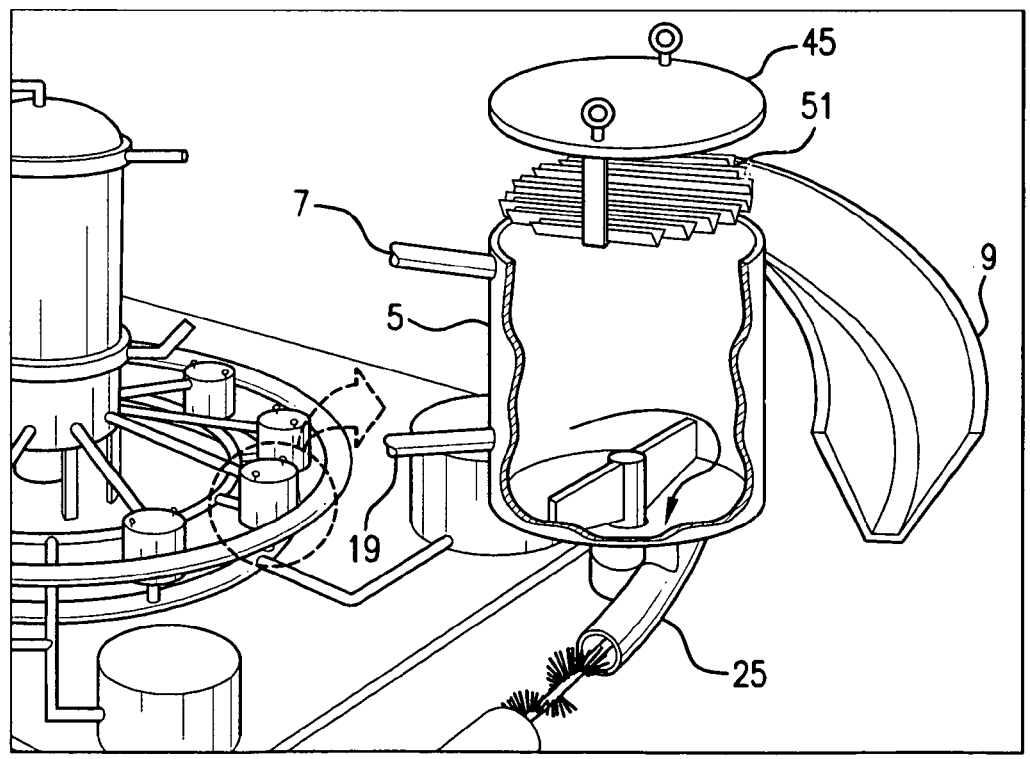
FIG. 12 shows an isometric cutout view of the stilling chamber of FIG. 3, wherein the sludge mixture collected at the bottom of the stilling chamber is being drained through the sludge outlet drain to empty the stilling chamber so that it will be ready to receive more slurry from the crystallization chamber.

Once the sludge has been stirred sufficiently to lower the viscosity thereof, a valve associated with, drainpipe 25, is preferably opened, to allow the sludge to drain from chamber 5, as shown in FIG. 12. Drainpipe 25 is preferably located at the bottom of chamber 5, to allow the heaviest sludge, which contains the mineral solids, to be easily drained out, and feed into sludge storage tank 17, via central pipe 27. A rotating sludge brush or pipe cleaner 61 can be provided within drainpipe 25, and any associated pipe, such as central pipe 27, to ensure that the sludge makes its way into tank 17. And because of the phase diagram for the creation of mineral solids, and by maintaining the temperature of the slurry and sludge at a predetermined amount, solid minerals, including salt crystals, will remain in the slurry and sludge, which can be easily removed from the liquid using any conventional filter.

Collection trough 9 is preferably extended around the outside perimeter of system 1, preferably equidistant to each stilling chamber 5. Collection trough 9 is preferably V-shaped in cross section, as shown in FIGS. 3-12, and is preferably positioned adjacent each stilling chamber 5 in a manner that, as shown in FIG. 9, enables the ice/snow mixture that accumulates in each stilling chamber 5 to be dumped and transported thereon. Trough 9 is preferably open and exposed to the room that system 1 is housed in, wherein the room can be kept at a suitable temperature to allow the ice/snow mixture to melt as it travels along trough 9. Trough 9 can be level, or arranged on a slight incline relative to potable water storage tank 13, if desired, such that melting ice/snow can travel along the trough 9 by gravity alone, or by seeking its own level. Trough 9 preferably allows the purified water to be fed into a first auxiliary pipe 11, which is connected to water storage tank 13, and used to transport the purified water from trough 9, into tank 13, where it can be stored.

Connected on the side of each stilling chamber 5 is preferably a second pipe 19, as better shown in FIGS. 3-12, that allows residual brine in each stilling chamber 5 to be distributed and transported away from stilling chamber 5. A central wheel-like pipe system 21, connected to second pipes 19, as shown in FIG. 1, preferably extends around main chamber 3, to collect the residual brine from second pipes 19, and transport the brine to brine storage tank 15. A second auxiliary pipe 23 is preferably extended from central pipe system 21, to brine storage tank 15, to feed brine into tank 15. An extra exhaust pipe 16, which leads back to main chamber 3, can be provided to recycle and re-circulate any extra brine leftover, so that it can be processed again.

Connected underneath each stilling chamber 5, as better shown in FIGS. 3-12, is preferably a drain pipe 25 that allows sludge collecting at the bottom of each stilling chamber 5 to be distributed and transported away from each stilling chamber 5. A second central wheel-like pipe 27 preferably extends around main chamber 3, to collect sludge from each drain pipe 25. A third auxiliary pipe 29 is preferably extended from second central pipe 27, to sludge storage tank 17, where the sludge can be stored.

Figure 16:
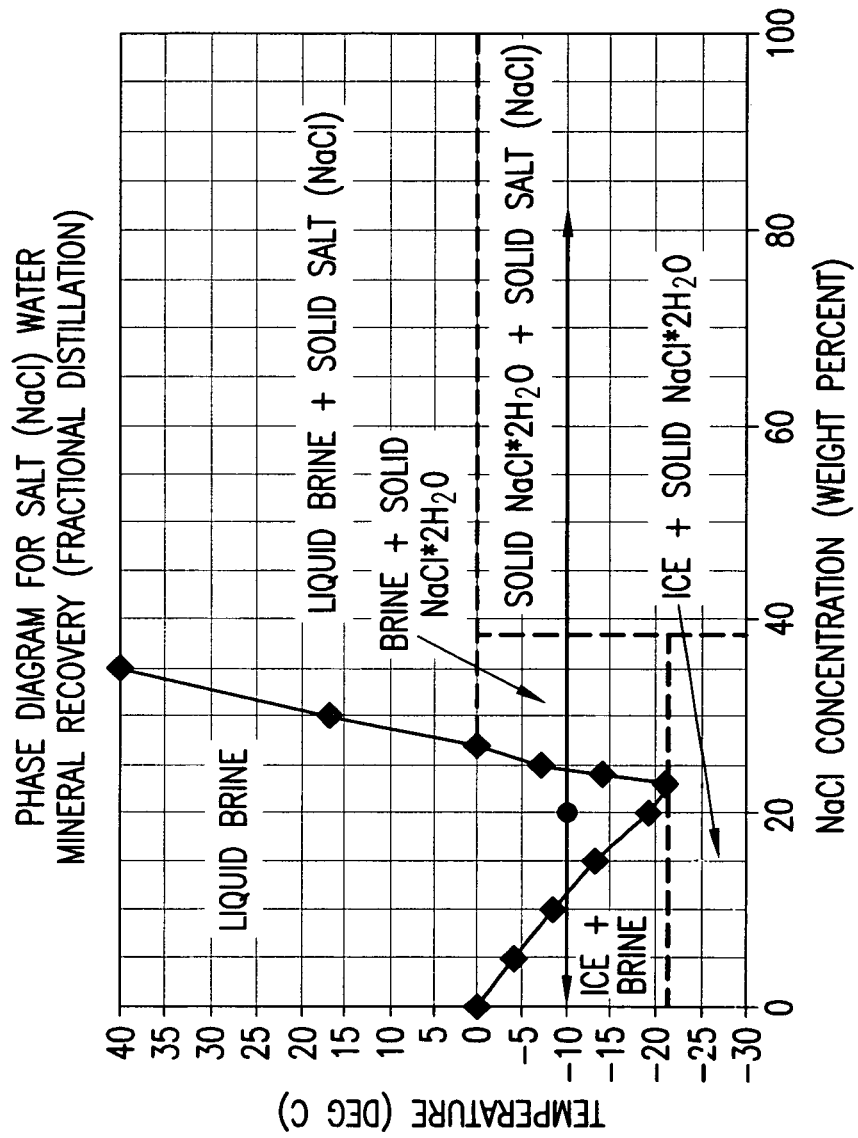
FIG. 16 shows another phase diagram for salt water.

The process by which the ice and solid mineral particles are formed in the slurry and brine, in relation to the temperatures and concentration levels, is shown by the phase diagram of FIG. 16. At the beginning of a cycle, using the present mineral recovery system, the concentrated brine that is processed is typically at about 20% to 23% mineral concentrate, mostly NaCl, by weight, which is slightly below the eutectic point. According to the phase diagram, this means that the area of the ice line pertinent to the process at that moment is just left of the eutectic point, for NaCl, which is about minus 21.1 degrees C., and 23.3% concentration. At this point, to form ice, it can be seen that the temperature of the chilled air introduced into main chamber 3 would have to be cold enough to reduce the temperature of the droplets to near the eutectic temperature of minus 21.1 degrees C. That is, because the brine is so heavily concentrated, the temperature of the brine would have to be lowered to near the eutectic temperature, or at least down to below the ice line, to enable more ice crystals to form within the brine. The preferred temperature of the brine droplets as they fall to the bottom of main chamber 3 is the eutectic temperature, to form a slurry mixture, wherein by virtue of agitator 35, the mixture is prevented from freezing into a mass.

The preferred temperature of the chilled air within chamber 3 is any temperature that achieves the appropriate cooling properties to produce ice particles within each droplet. This can depend on the initial temperature of the concentrated brine, which can be minus 10 degrees C., as well as the temperature of the chilled air, the residence time in the droplets in the air, the height of the main chamber 3, the size of the droplets, the volume rate of chilled air being introduced, etc.

During this process, as more ice forms, and the brine becomes more concentrated, the area of the phase diagram immediately at, and/or to the right of, the eutectic point, becomes relevant. As can be seen in FIG. 16, as more ice forms, and the brine becomes more concentrated, and reaches the eutectic concentration of 23.3% for NaCl, the temperature of the brine would have to be kept at or below the eutectic temperature for ice to form. And, in such case, as ice forms, so will solid NaCl particles, i.e., NaCl 2H$_2$O will be formed, wherein the mixture that results will contain a combination of 1) ice crystals, 2) concentrated brine, and 3) solid salt crystals.

But at this point, even as the temperature of the brine rises back up, to above the eutectic temperature, a combination of brine and solid NaCl will continue to form. Note that this corresponds to the area in the phase diagram just right of the eutectic point, but above the eutectic temperature, where it is indicated that brine and solid NaCl*2H$_2$O forms. If necessary, additional salt can be added to the mixture to increase the concentration of the slurry, and ensure that the right side of the phase diagram is reached.

It is at this juncture that the slurry mixture will remain as the slurry is being mixed within the stilling chamber 5, wherein the slurry will contain a combination of 1) ice crystals, 2) concentrated brine, and 3) solid mineral crystals. Even as the temperature rises to slightly above the eutectic temperature, the ice crystals in the mixture will remain, and, as the mixture is stirred, more solid mineral or salt crystals will continue to form as well, i.e., so long as the salt concentration levels exceed the eutectic concentration amount—below the solubility line.

In one embodiment, as the slurry settles in stilling chamber 5, the preferred temperature of the mixture will be about minus 10 degrees C., wherein the ice particles will rise to the top, and the salt solids will drop to the bottom, and then, the brine will begin to separate by layers, into a gradient, between a more highly concentrated brine at the bottom, and a less concentrated brine near the top.

Note that, as salt solidifies, the NaCl concentration in the liquid brine is likely to be reduced again, by virtue of the salts becoming solidified and removed from the liquid portion of the brine. That is, as salt particles form, they are effectively removed from the liquid portion of the brine, and therefore, what remains will be less concentrated than it was previously. This is another reason why the slurry will tend to remain at the equilibrium described above, rather than becoming super concentrated.

Because seawater contains various minerals, in addition to NaCl, which have different eutectic temperatures and concentration levels, as discussed above, different considerations should be given, as follows: Based on these differences, it can be seen that different minerals will begin to solidify at different temperatures and concentration levels, and the aqueous portion of the mixture will be begin to freeze at different temperatures depending on what minerals are dissolved therein. Therefore, a variety of different compositions can be formed, based on the temperature and concentration levels that are used, wherein the extent to which any particular mineral is solidified, and therefore, extracted can be controlled and determined to some extent, i.e., by what temperature is reached, and what concentration level is obtained.

For example, if an aqueous solution contains only two minerals, such as those discussed above, i.e., NaCl and MgSO4, with about twenty times more NaCl than MgSO4, which is the case in seawater, the following might occur: As the temperature of the solution is decreased to slightly below 0 degrees C., ice particles may begin to form, but as the ice forms, and the solution becomes more concentrated, the temperature would have to be decreased further, i.e., along the ice line, for ice to continue to form. When the temperature drops below minus 3.9 degrees C., solid MgSO4 may begin to form, based on the eutectic point of MgSO4, although no solid NaCl will form until after the temperature drops to minus 21.1 degrees C., the eutectic temperature of NaCl. Moreover, because NaCl is the dominant solute in the solution, it is likely that the ice forming characteristics of the solution will follow more closely along the ice line of NaCl, rather than MgSO4. Accordingly, as ice forms, and the NaCl concentration of the solution increases, ice will likely form when the temperature and concentration level of the solution is closer to below the ice line of NaCl, and may not form, for example, above that line, even if they are below the ice line of MgSO4. Nevertheless, when the temperature is below the eutectic temperature of MgSO4, solid MgSO4 particles are likely to form, and then, when the temperature drops to minus 21.1 degrees C., solid NaCl will form, i.e., both NaCl and hydrated NaCl (or NaCl*2H$_2$O).

For these reasons, the present invention contemplates that the various stilling chambers 5 can be provided with cooling elements that enable the slurry to reach different temperatures. Likewise, system 1 can be adapted so that different chilled air temperatures can be used, wherein by controlling the temperature that is reached by the slurry, one can control the type of minerals that are solidified, and therefore, extracted. In one embodiment, different stilling chambers can be used at different temperatures to produce different mineral solids, segregated from the others. It would also seem appropriate to have the first stilling chamber be at the highest temperature, and then have each stilling chamber 5 progressively becomes colder, so that the minerals that solidify first are those that can be extracted at a relatively higher temperature, while leaving behind the minerals that solidify at colder temperatures for later. That way, the brine can be processed at progressively colder temperatures, to further remove and separate out those minerals based on their eutectic temperatures. In such case, it may be appropriate to have different collection tanks provided for each of the different stilling chambers, such that with each stilling chamber 5 that processes the slurry, a different type of mineral can be removed and extracted and collected separately, rather than be combined into one sludge tank.

The remainder of the discussion will focus on specific characteristics of the phase diagram. FIG. 16 shows the phase diagram with a further separation between the solid phases at 38% NaCl concentration wherein there is liquid brine and solid $NaCl*2H_2O$ at lower than 38% concentration of salt; and there is solid $NaCl*2H_2O$ and solid NaCl at higher than 38% concentration. FIG. 16 shows that there is yet another phase boundary at 38% wherein there is saturated liquid (L) brine at 38% NaCl and a solid hydrated salt, $NaCl*2H_2O$. Above 38% there are two solid salts: $NaCl*2H_2O$ and NaCl.

The foregoing discussion assumes that equilibrium is maintained throughout the course of crystallization. This means that with falling temperatures and continuing crystallization, the earlier-formed crystals react continuously with the liquid to produce homogeneous crystals that will become continuously more enriched in the salt component. This equilibrium process is defined in the "phase diagram". If this equilibrium cannot be maintained, then fractional crystallization will take place and the phase diagram must be used differently.

The fresh water crystals are continuously removed from the liquid brine by rising up from the solution. Reaction of the removed fresh water from the brine is prevented so the composition of the liquid brine will continue to change along the liquidus curve, across the eutectic composition and then across the solidus curve. The only limit to this change of composition of the liquid brine, whose fraction becomes smaller and smaller, is the composition of the pure salt (NaCl). This fractional crystallization sweeps across the phase diagram and produces the progressive floating layers of ice, unsaturated salt liquid brine, saturated salt liquid brine and $NaCl*2H_2O$ crystal (solid) and NaCl crystal (solid).

What is claimed is:

1. A mineral recovery system comprising:
a desalination system using compressed air to create super chilled air that can be released to flash freeze seawater droplets in a vessel, wherein fresh drinking water and a concentrated brine mixture can be produced thereby;
a crystallization chamber for introducing said concentrated brine mixture produced by said desalination system and mixing said concentrated brine mixture with the super chilled air produced by said desalination system to form a super chilled slurry mixture, wherein an agitator for mixing said super chilled slurry mixture is provided at or near the bottom of said crystallization chamber;
multiple stilling chambers communicating with said crystallization chamber provided around the perimeter of said crystallization chamber into which said super chilled slurry mixture can be distributed, wherein each stilling chamber comprises:
1) at least one valve for releasing a predetermined quantity of said super chilled slurry mixture into said stilling chamber;
2) at least one strainer for removing ice particles from said stilling chamber;
3) at least one agitator for mixing said slurry within said stilling chamber;
4) at least one brine outlet for draining leftover brine mixture from said stilling chamber; and
5) at least one sludge outlet for draining leftover sludge mixture from said stilling chamber;
a trough onto which the ice particles removed by said strainer can be placed which allows the ice particles to melt to produce relatively clean water;
a brine pipe communicating with said brine outlet of each of the multiple stilling chambers for distributing said leftover brine mixture from the multiple stilling chambers to an associated brine storage tank for storing said brine mixture, and a sludge mixture pipe communicating with said sludge outlet of each of the multiple stilling chambers for distributing said leftover sludge mixture from the multiple stilling chambers to an associated sludge storage tank for storing said sludge mixture; and
wherein a valve control system is provided adapted to allow a predetermined amount of said slurry mixture to be introduced into each of said stilling chambers at a predetermined rate in succession, wherein once a first of said stilling chambers has completed its cycle, more of the slurry mixture from said crystallization chamber can be introduced into said first stilling chamber.

2. The system of claim 1, wherein said crystallization chamber has at least one inlet nozzle at or near the top of said crystallization chamber for introducing said concentrated brine mixture in the form of a spray therein, and at least one intermediately located inlet for introducing said super chilled air into said chamber.

3. The system of claim 2, wherein at least one vent is provided at or near the top of said crystallization chamber which allows said super chilled air to circulate upward through said crystallization chamber, wherein said concentrated brine mixture can be sprayed down from said inlet nozzle onto said super chilled air circulating upward.

4. The system of claim 1, wherein the strainer comprises multiple V shaped railings which enable ice particles to float vertically upward through said strainer between the railings, but as the ice particles begin to agglomerate, and form a mass of ice above said strainer, the railings can be used to lift said mass from said stilling chamber and enable said ice mass to be easily slid down onto said trough.

5. The system of claim 1, wherein each stilling chamber is adapted to maintain the slurry mixture contained therein at a predetermined temperature such that the eutectic temperature and composition of different minerals contained in the seawater can be accounted for, which enables different minerals to solidify at different temperatures, which in turn, allows for different minerals to be removed and extracted from said stilling chambers.

6. A method of removing and recovering minerals from seawater comprising:
creating super chilled air using a desalination system with a compressor and expander and producing fresh drinking water and a concentrated brine mixture using said desalination system;

introducing said super chilled air and said concentrated brine mixture from said desalination system into a crystallization chamber and mixing said super chilled air with said concentrated brine mixture together to form a super chilled slurry mixture;

mixing said super chilled slurry mixture with an agitator provided at or near the bottom of said crystallization chamber;

introducing a predetermined amount of said super chilled slurry mixture from said crystallization chamber into multiple stilling chambers communicating with said crystallization chamber, wherein each of said stilling chambers comprise:
1) at least one valve for introducing a predetermined quantity of said super chilled slurry mixture into each of said stilling chambers;
2) at least one strainer for removing ice particles from each of said stilling chambers;
3) at least one agitator for mixing said slurry within each of said stilling chambers;
4) at least one brine outlet for draining leftover brine mixture from each of said stilling chambers;
5) at least one sludge outlet for draining leftover sludge mixture from each of said stilling chambers;

wherein the step of introducing said slurry mixture into said stilling chambers comprises using a valve control system that introduces a predetermined quantity of said slurry mixture into each of said stilling chambers at a predetermined rate in succession, such that by the time a first stilling chamber has completed its cycle, more of the slurry mixture from said crystallization chamber can be introduced into said first stilling chamber;

removing the ice particles from each of said stilling chambers using said strainer and distributing the ice particles from said stilling chambers onto a trough and allowing the ice particles to melt; and removing the leftover brine mixture and leftover sludge mixture from each of said stilling chambers and collecting the minerals therein.

7. The method of claim 6, further comprising using at least one inlet nozzle at or near the top of said crystallization chamber for introducing said concentrated brine mixture in the form of a spray therein, and at least one inlet for introducing said super chilled air into said crystallization chamber.

8. The method of claim 7, further comprising venting said super chilled air at or near the top of said chamber to allow said super chilled air to circulate upward through said chamber, wherein said concentrated brine mixture can be sprayed down from said inlet nozzle onto said super chilled air circulating upward.

9. The method of claim 6, further comprising providing said strainers with multiple V shaped railings and allowing ice particles within the slurry mixture to float vertically upward through said strainer between said railings, and then allowing the ice particles to agglomerate and form a mass of ice above said strainer, wherein the railings can be used to lift said mass from said stilling chamber and enable said ice mass to be removed therefrom.

10. The method of claim 9, further comprising allowing said ice mass to slide off of said strainer and onto said trough and allowing said ice mass to melt to form clean water that can be stored in a water storage tank.

11. The method of claim 6, further comprising removing said leftover brine from said stilling chambers thru a brine pipe in communication with said at least one brine outlet of each of the multiple stilling chambers to a separate brine storage tank for storing said leftover brine.

12. The method of claim 6, further comprising removing said leftover sludge mixture from said stilling chambers thru a sludge mixture pipe in communication with said at least one sludge outlet of each of the multiple stilling chambers to a separate a sludge storage tank for storing said leftover sludge, wherein solid mineral crystals contained therein can be removed therefrom.

13. The method of claim 6 further comprising maintaining the temperature within each stilling chamber at a predetermined temperature such that the eutectic temperature and composition of different minerals contained within the slurry mixture can be accounted for, wherein the method enables different minerals within the slurry mixture to solidify at different temperatures, which in turn, allows for different minerals to be removed and extracted from said stilling chambers.

14. The method of claim 13, further comprising storing the sludge mixture from each of said stilling chambers in a different storage tank, such that different minerals can be removed and extracted from each of said stilling chambers.

* * * * *